United States Patent
Savas

(10) Patent No.: US 6,886,318 B2
(45) Date of Patent: May 3, 2005

(54) APPARATUS AND METHOD FOR REMOVING PINE NEEDLES FROM A SCREEN

(76) Inventor: Christopher L. Savas, 2854 Foxwood Ct., Clearwater, FL (US) 33761

(*) Notice: Subject to any disclaimer, the term of this patent is extended or adjusted under 35 U.S.C. 154(b) by 0 days.

(21) Appl. No.: 10/319,993

(22) Filed: Dec. 16, 2002

(65) Prior Publication Data
US 2004/0112036 A1 Jun. 17, 2004

(51) Int. Cl.[7] ............................................. A01D 7/00
(52) U.S. Cl. ........................................................ 56/400.01
(58) Field of Search ............................ 56/400.01, 400.04, 56/400.12, 400.16, 400.17, 400.21; 294/49, 51, 59.5; D8/9, 13

(56) References Cited

U.S. PATENT DOCUMENTS

| | | | |
|---|---|---|---|
| 1,014,250 A | | 1/1912 | Norman |
| 1,141,423 A | * | 6/1915 | Simas .......................... 37/316 |
| D49,762 S | * | 10/1916 | Doust ............................. D8/9 |
| 2,065,830 A | | 12/1936 | Sherman |
| 2,075,220 A | * | 3/1937 | Neuhausen .............. 56/400.17 |
| D105,902 S | | 8/1937 | Sherman |
| 2,300,729 A | * | 11/1942 | Kemmer .................. 56/400.17 |
| 2,738,214 A | * | 3/1956 | Zimmers .................... 294/19.2 |
| 2,767,545 A | * | 10/1956 | Jenkins .................... 56/400.06 |
| D220,420 S | * | 4/1971 | Rothwell ...................... D8/13 |
| 3,739,562 A | * | 6/1973 | McNamara .............. 56/400.06 |
| 3,833,250 A | * | 9/1974 | Lawrence .................. 294/50.6 |
| 3,901,010 A | * | 8/1975 | Pajunen .................... 56/400.08 |
| D306,962 S | * | 4/1990 | Schuele ........................ D8/13 |
| 5,246,260 A | * | 9/1993 | Racicot .................... 294/19.2 |
| D344,661 S | * | 3/1994 | Schule ........................ D8/13 |
| 5,425,226 A | | 6/1995 | Kaufman |
| 5,527,077 A | * | 6/1996 | Bickar .......................... 294/52 |
| 5,564,267 A | * | 10/1996 | Bricker et al. ........... 56/400.12 |
| D375,883 S | * | 11/1996 | Fomby ........................ D8/13 |
| 5,641,237 A | * | 6/1997 | Albert et al. ............... 403/372 |
| 5,713,193 A | * | 2/1998 | Stapley et al. ........... 56/400.08 |
| D392,854 S | | 3/1998 | Gregory |
| 5,937,473 A | * | 8/1999 | Lisowski .................. 15/236.08 |
| 6,009,697 A | * | 1/2000 | Billado .................... 56/400.08 |
| 6,463,727 B2 | | 10/2002 | Blyth |

* cited by examiner

*Primary Examiner*—Árpád F. Kovács
(74) *Attorney, Agent, or Firm*—Larson & Larson, PA; Herbert W. Larson

(57) ABSTRACT

Providing a longitudinal U-shaped rake head attached to a pole by a connector. The rake head, in relation to the pole, has multiple upwardly curved fingers spaced apart by a groove. Each finger has a split end with a slot separating pointed ends of each finger. The rake head is pulled towards a person holding the pole along a screen surface imbedded with pine needles. The pulling motion removes the pine needles from the screen and impales them on the rake head.

20 Claims, 5 Drawing Sheets

APPARATUS AND METHOD FOR REMOVING PINE NEEDLES FROM A SCREEN

BACKGROUND OF THE INVENTION

This invention relates to a method of removing pine needles imbedded in screening. More particularly, it refers to the use of a rake head device for removing pine needles from screening.

Lawn rakes, leaf rakes and general debris removal rakes are generally U-shaped in configuration and have tines at an end portion. Such tines are usually equally spaced apart and are not designed for removal of pine needles from a screen. Typical prior art rakes are found in Des Pat. No. 105,902; Des Pat. No. 392,854; U.S. Pat. Nos. 1,014,250; 2,065,830; 5,425,226 and 6,463,727. None of these rakes is suitably designed to remove pine needles from screens. Pine needles have multiple projections that make it particularly difficult to remove them from screening material. Since many homes in areas where pine trees predominate have screen enclosures to protect against insects it becomes a necessity to have some method of easily removing pine needles imbedded in screens. Such a method employing an inexpensive apparatus is sorely needed.

SUMMARY OF THE INVENTION

The present invention solves the problem of embedded pine needles in screening material by providing a method for the removal of such pine needles employing an inexpensive apparatus. An elongated one-piece rake head attached to a rod or pole by a connector is provided with multiple upwardly curved fingers closely spaced apart from adjacent fingers by a groove less than one-quarter inch wide. Each finger has an end slot which separates two pointed finger tip ends. Such slot is parallel to the groove but has a narrower width than the groove. The rake head attached to a pole with a connector is moved towards the operator along the outer surface of the screening material. Any imbedded pine needles are grabbed by the rake head grooves and slots and are pulled free from the screening material.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE BEST MODE

Figure 1:
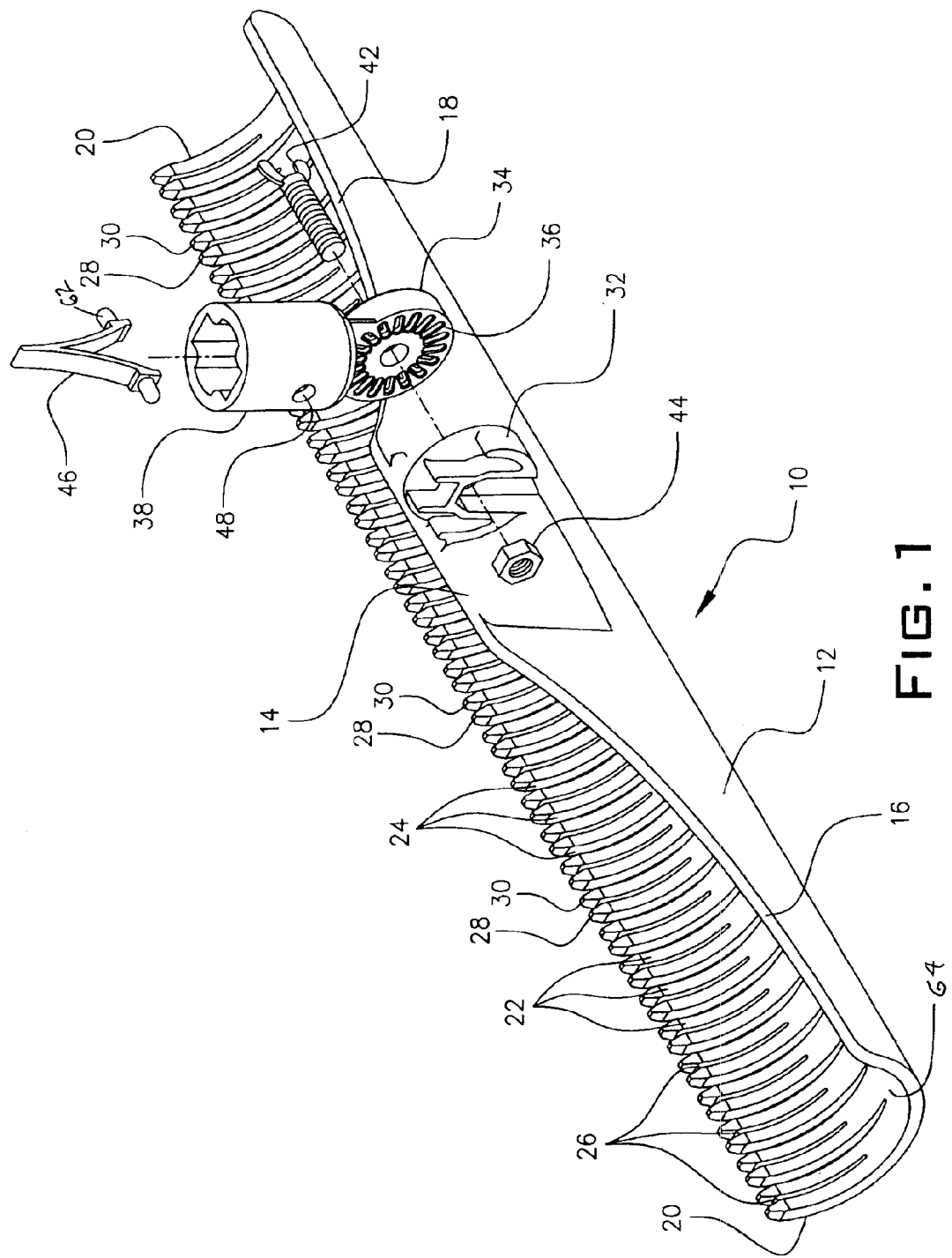
FIG. 1 is a perspective view of the rake head employed in this invention with its rake handle connector in exploded view.

Throughout the following detailed description, the same reference numerals refer to the same elements in all figures.

Figure 2:
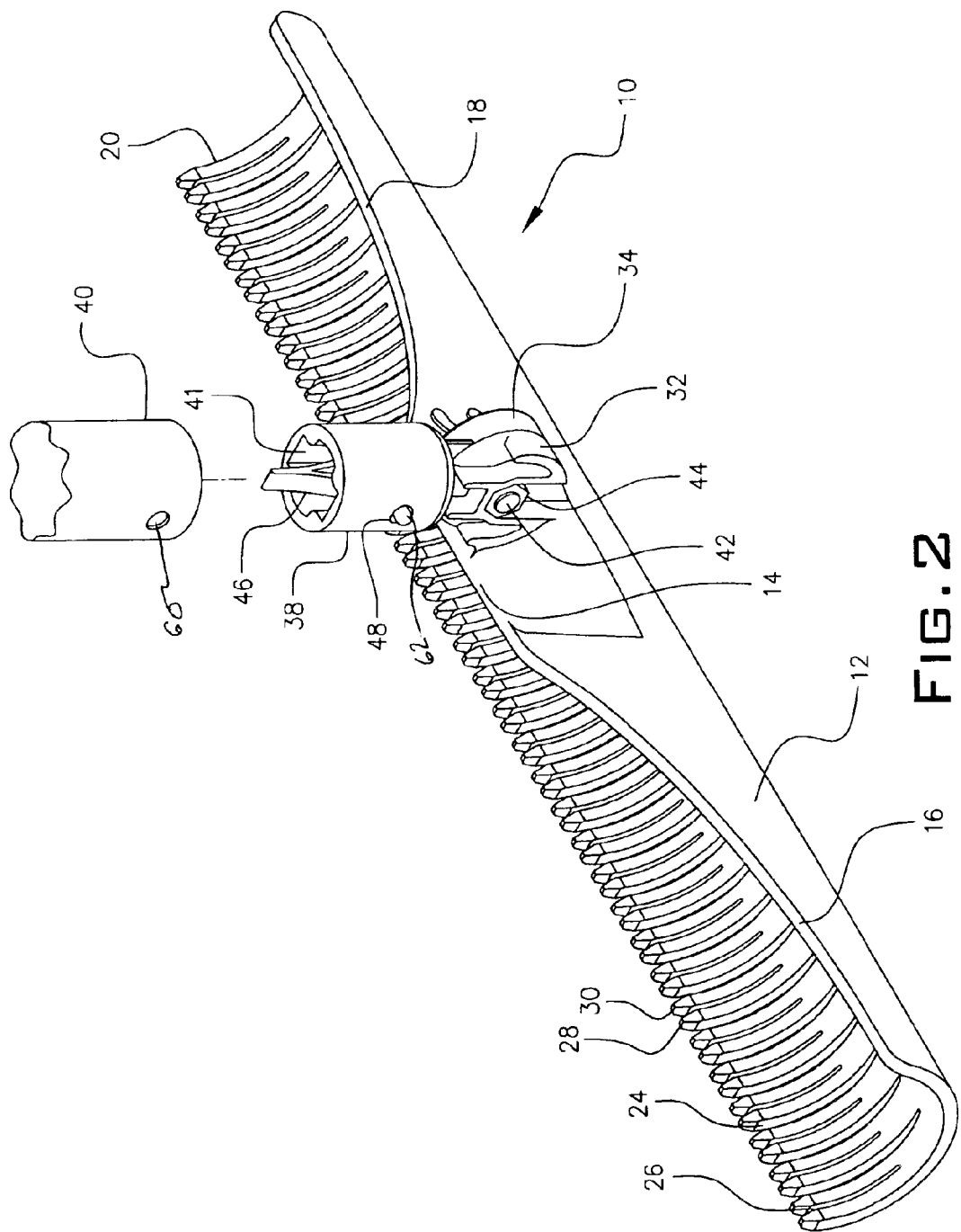
FIG. 2 is a perspective view of the rake head of FIG. 2 with the rake handle connector attached.
Figure 3:
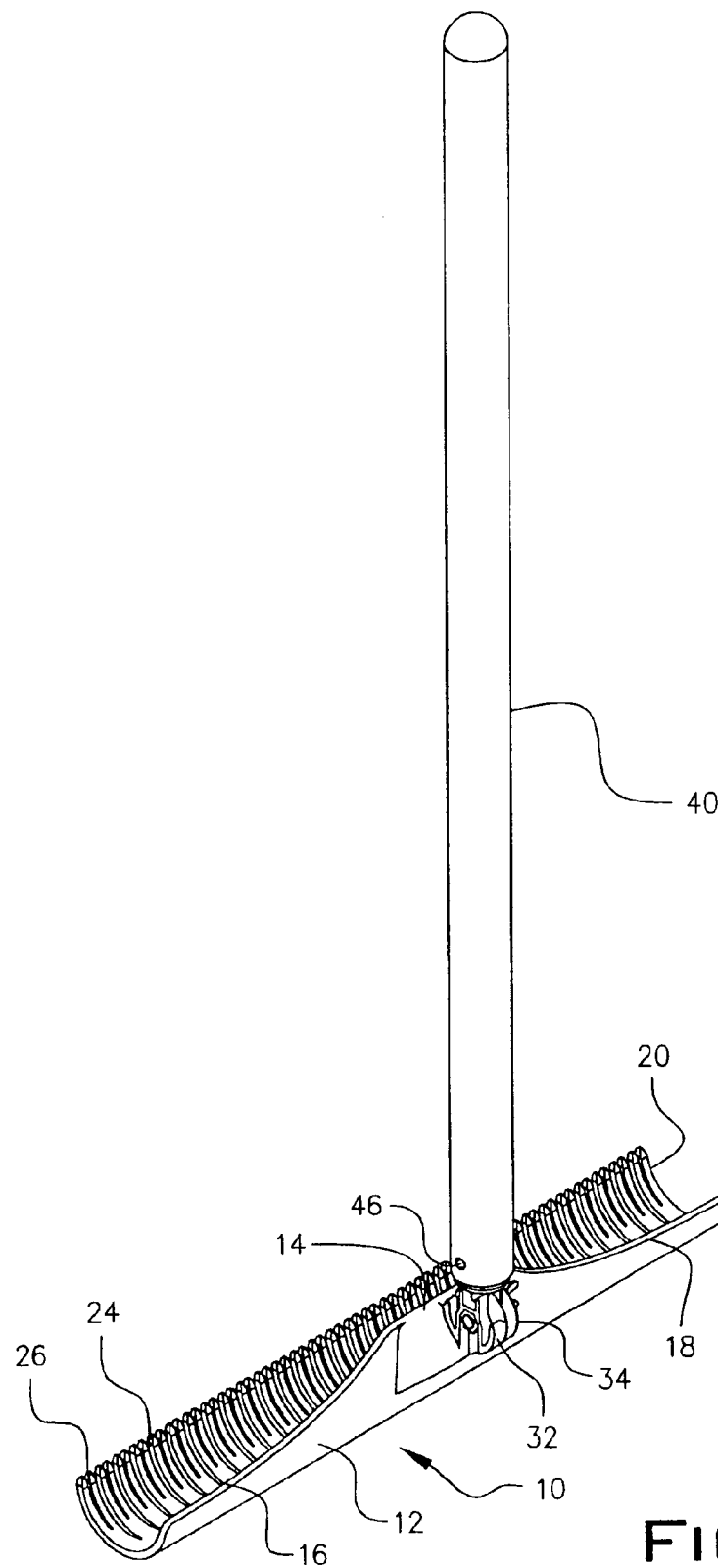
FIG. 3 is an elevational perspective view of the rake head and handle.

Referring to FIGS. 1–3, the rake head 10 has a generally U-shaped configuration with a smooth walled back portion 12 descending from a top straight edge 14 to downwardly descending edges 16 and 18 respectively, on each side of the straight edge 14. A front portion 20 has multiple upwardly curved fingers 22 separated by grooves 24. Such grooves are about one-quarter inch or less in width. The end portion of each finger 22 is divided by a slot 26 that is narrower than groove 24 and is usually about one-eighth or less inches in width. Slot 26 results in the creation of a pair of finger tips 28 and 30, respectively, at the end of each finger 22. The front portion 20 and back portion 12 is separated by a trough 64.

Still referring to FIGS. 1–3, an integral lug 32 is molded to the back portion 12 of rake head 10 just below the straight edge 14. A connector 34 has a spider pattern 36 and a collar 38 for mounting a hollow pole 40 on the exterior of collar 38. The spider pattern 36 is engaged to a vertical surface of lug 32. A transverse bore in both the connector 34 and the lug 32 receives a bolt 42 and nut 44 holds the bolt in place to attach the connector 34 to the rake head 10. A spring snap 46 having a pair of nipples 62 is inserted in vertical bore 41 of the connector 34. As pole 40 is lowered over connector 34 as seen in FIG. 2 the nipples 62 are first pushed inwardly and then snap out through bore 60 in pole 40 to attach the pole 40 to the connector 34.

The rake head 10 and lug 32 are combined as a one piece molded polymer. The polymer is polypropylene, polyethyleneterepthalate, polyvinyl acetate or other high strength polymer.

Figure 4:
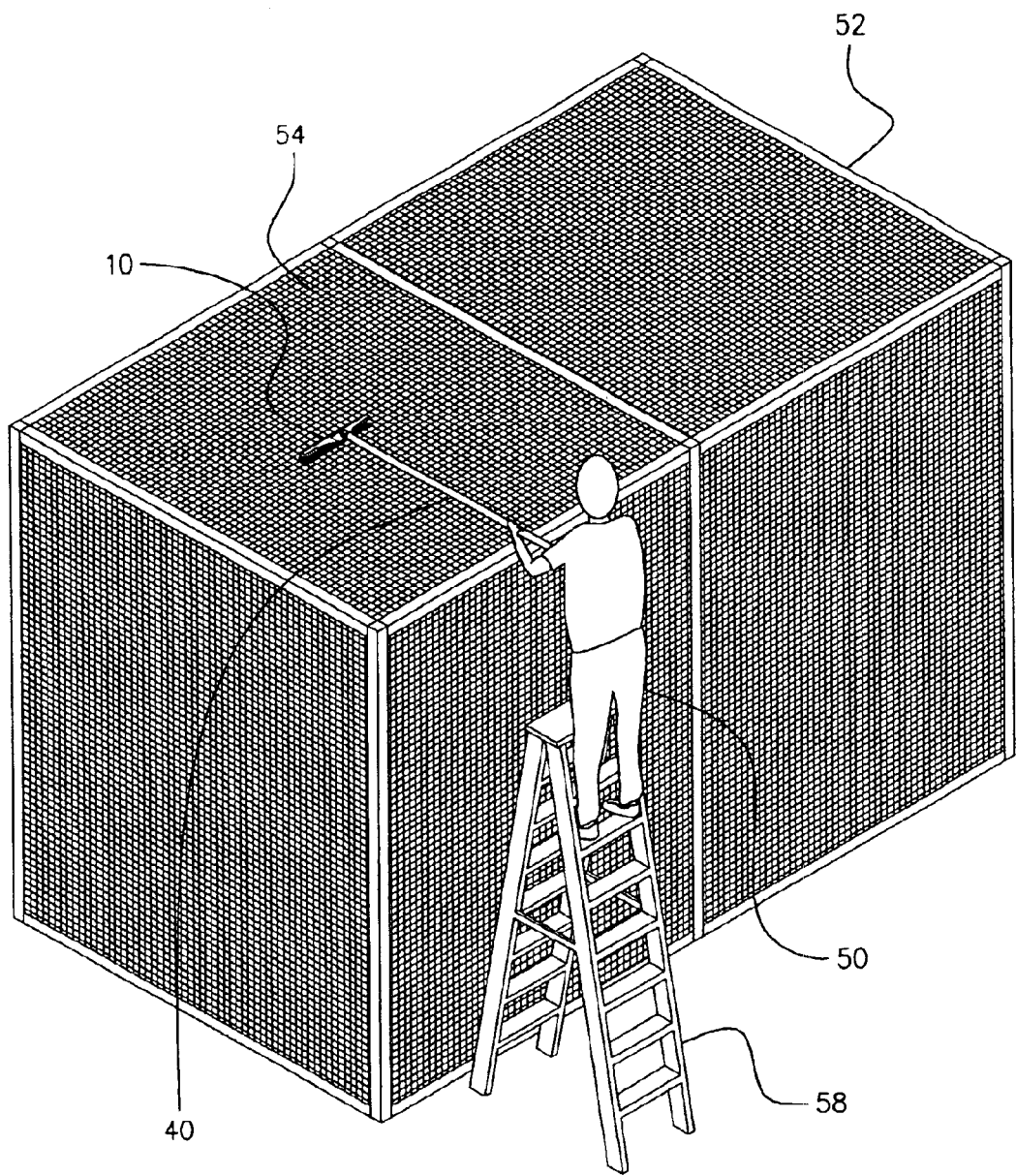
FIG. 4 is a view of pine needles being removed from a screen.
Figure 5:
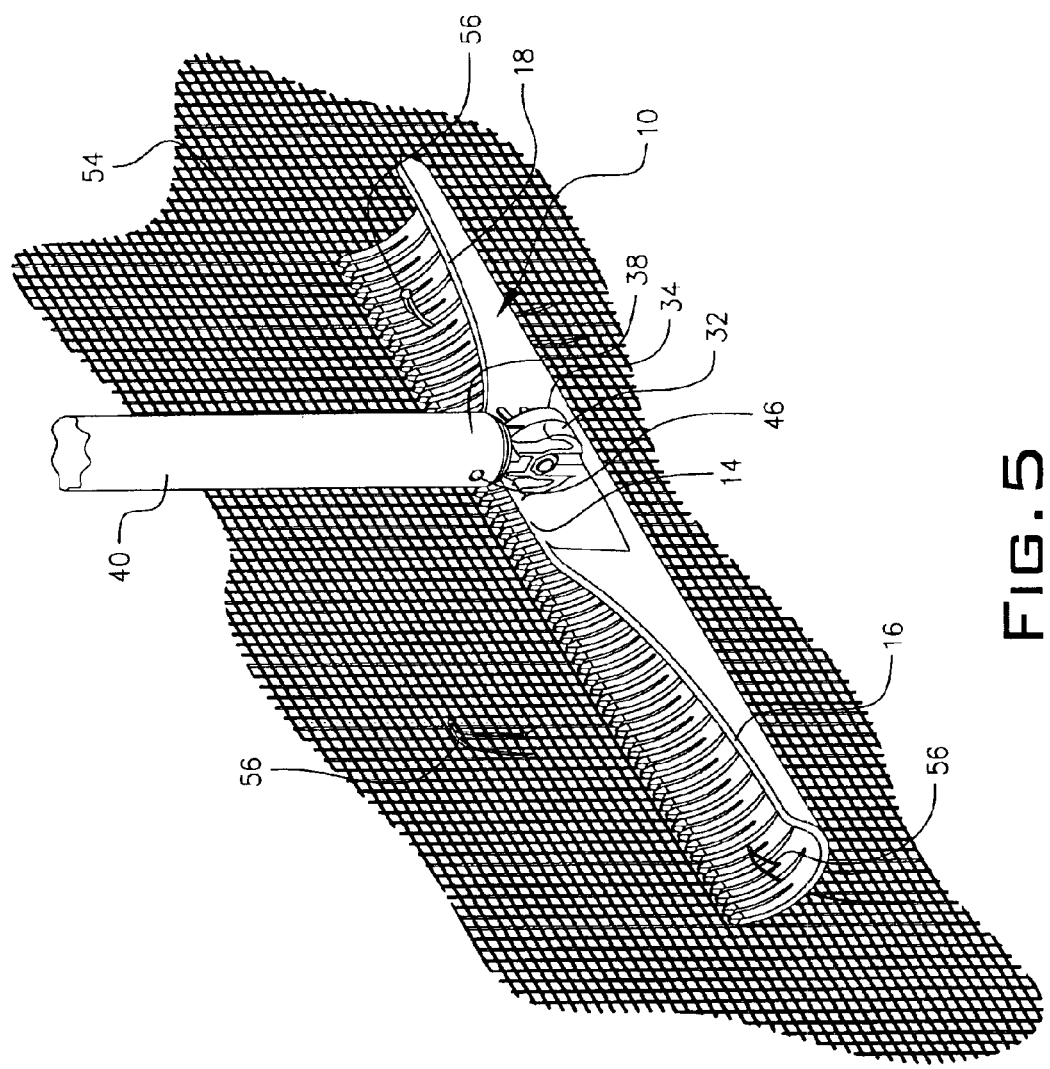
FIG. 5 is a close-up view of the rake head removing pine needles from a screen.

The rake head 10 is operated by a person 50 pulling the rake head on top 52 of a screen enclosure 54 as seen in FIG. 4. The sides of the screen is cleared by the person 50 standing on the ground. Pole 40 is operated to move rake head 10 towards person 50 along the screen enclosure 54 over areas containing pine needles 56. As seen in FIG. 5, the pine needles 56 are captured in grooves 24 and slots 26.

In addition to pine needles, other debris can be removed from screening with the rake head. Such other debris can include moss, leaves, vines, twigs and acorns.

It is understood that a person skilled in the art may make equivalent substitutions for elements employed in the rake head and method without departing from the spirit and scope of the invention. All such equivalents are to be included within the scope of the invention as defined in the appended claims.

Having described the invention, what is claimed is:

1. A method for removing pine needles imbedded in screening, the method comprising:
   providing a rake head having a generally U-shaped longitudinal configuration, an outer edge portion having a row of upwardly curved multiple pairs of fingers, each finger pair spaced apart from an adjacent finger pair by a groove less than one-quarter inch wide, each finger pair having a slot parallel to the groove, the slot separating a pair of pointed ends of the finger pair and the slot having a narrower width than the groove;
   providing the rake head with a means for attaching the rake head to a hand-held pole; and
   providing a person positioned adjacent the screening imbedded with pine needles and having the person pull the rake head towards the person along the screen enclosure to remove imbedded pine needles.

2. The method according to claim 1 wherein the means provided for attaching the rake head to the pole is a lug integral with a back wall of the rake head, the lug attached to a connector having a surface in contact with the lug and a collar on the connector receiving a hollow end of the pole.

3. The method according to claim 1 wherein the rake head is provided with a curved back wall having a straight middle upper edge descending downwardly to a first and second end of the rake head.

4. The method according to claim 2 wherein the rake head and lug are provided as an integral molded polymer.

5. The method according to claim 2 wherein a bolt is provided to attach the connector to the lug.

6. A method for removing pine needles imbedded in screening, the method comprising:
providing a rake head having a first and second upwardly curved longitudinal portion with a trough separating the first and second portions, the first portion consisting of a row of upwardly curved multiple pairs of fingers, each finger pair spaced apart from an adjacent finger pair by a groove less than one-quarter inch wide, each finger pair having a slot parallel to the groove, the slot separating a pair of ends of the finger pair and the slot having a narrower width than the groove;
providing the rake head with a means for attaching the rake head to a hand-held pole; and
providing a person positioned adjacent the screening imbedded with pine needles and having the person pull the pole towards the person with the rake head to remove imbedded pine needles.

7. The method according to claim 6 wherein the rake head is provided as an integral molded polymer.

8. The method according to claim 6 wherein the means provided for attaching the rake head to the pole is a lug integral with a back surface of the second portion of the rake head, the lug attached to a connector having a collar with an external annular surface for receipt of an end of a hollow pole.

9. The method according to claim 8 wherein a first bolt is provided to attach the connector to the lug through an axial bore in the connector and the lug, a nut threaded to an end of the bolt to hold the connector and lug together.

10. The method according to claim 8 wherein a spring snap with opposed nipples is inserted into a bore in the collar so that the nipples engage openings in the pole to attach the pole to the connector.

11. The method according to claim 8 wherein the rake head and lug are provided as an integral molded polymer.

12. A rake head connected to a hollow end of a pole for removing pine needles imbedded in screening, the rake head comprising:
a longitudinal one piece molded polymer having a first and second upwardly curved portion with a trough separating the first and second portions, the first portion consisting of a row of upwardly curved multiple pairs of fingers, each finger pair spaced apart from an adjacent finger pair by a groove less than one-quarter inch wide each finger pair having a slot parallel to the groove, the slot separating a pair of ends of the finger pair and the slot having a narrower width than the groove; and
a connector for attaching the rake head to the hollow end of the pole.

13. The rake head according to claim 12 wherein the second upwardly curved portion has a top edge that is parallel with the trough at a mid-section and descends downwardly from each side of the mid-section.

14. The rake head according to claim 13 wherein a lug is integral with a back surface of the second upwardly curved portion.

15. The rake head according to claim 14 wherein the lug has a first transverse bore axially aligned with a second transverse bore in the connector with a bolt through each bore and a nut at the end of the bolt to connect the rake head to the connector.

16. The rake head according to claim 12 wherein the connector has a collar for connecting to the hollow end of the pole.

17. The rake head according to claim 14 wherein the rake head and lug are a combined one piece molded polymer.

18. The rake head according to claim 17 wherein the polymer is a polyethyleneterepthalate.

19. The rake head according to claim 12 wherein the pair of ends of the finger are pointed.

20. The rake head according to claim 16 wherein the collar is connected to the hollow end of the pole by nipples at the end of a spring snap mounted inside a bore in the collar.

* * * * *